(12) United States Patent
Haller et al.

(10) Patent No.: US 12,565,437 B2
(45) Date of Patent: Mar. 3, 2026

(54) GLASS TRANSPORT SYSTEM

(71) Applicant: CORNING INCORPORATED, Corning, NY (US)

(72) Inventors: Mitchell Bruce Haller, Horseheads, NY (US); Jason Arthur Howles, Corning, NY (US); Mark Edwin Lee Mack, Millport, NY (US)

(73) Assignee: CORNING INCORPORATED, Corning, NY (US)

( * ) Notice: Subject to any disclaimer, the term of this patent is extended or adjusted under 35 U.S.C. 154(b) by 260 days.

(21) Appl. No.: 18/276,376

(22) PCT Filed: Jan. 31, 2022

(86) PCT No.: PCT/US2022/014510
§ 371 (c)(1),
(2) Date: Aug. 8, 2023

(87) PCT Pub. No.: WO2022/173604
PCT Pub. Date: Aug. 18, 2022

(65) Prior Publication Data
US 2024/0116795 A1 Apr. 11, 2024

Related U.S. Application Data

(60) Provisional application No. 63/147,471, filed on Feb. 9, 2021.

(51) Int. Cl.
*C03B 7/02* (2006.01)
*C03B 5/43* (2006.01)

(52) U.S. Cl.
CPC . *C03B 7/02* (2013.01); *C03B 5/43* (2013.01)

(58) Field of Classification Search
None
See application file for complete search history.

(56) References Cited

U.S. PATENT DOCUMENTS

| | | | |
|---|---|---|---|
| 4,240,408 A | 12/1980 | Schael | |
| 5,928,717 A | 7/1999 | Cherico et al. | |
| 2008/0148779 A1 | 6/2008 | Takeshita et al. | |
| 2009/0272150 A1 | 11/2009 | Kotacska et al. | |

(Continued)

FOREIGN PATENT DOCUMENTS

| | | |
|---|---|---|
| CN | 102442755 A | 5/2012 |
| CN | 102585789 A | 7/2012 |
| CN | 102167604 B | 4/2013 |

(Continued)

OTHER PUBLICATIONS

Machine translation JP-4316615-B2 (Year: 2009).*

(Continued)

*Primary Examiner* — Jodi C Franklin
(74) *Attorney, Agent, or Firm* — Ryan T. Hardee; Grant A. Gildehaus

(57) ABSTRACT

A glass transport system configured to mitigate or stop damaging glass leaks by incorporating silica-containing structural components or introducing silica-containing materials to the advancing glass leak flow to cause the molten glass to interact with silica in the silica-containing material and increase the viscosity of the molten glass sufficiently to slowdown or stop the flow of the glass leak.

19 Claims, 6 Drawing Sheets

(56)                    References Cited

U.S. PATENT DOCUMENTS

| | | | |
|---|---|---|---|
| 2016/0039702 A1 | 2/2016 | Nagai et al. | |
| 2021/0032148 A1 | 2/2021 | Howles et al. | |

FOREIGN PATENT DOCUMENTS

| | | | | |
|---|---|---|---|---|
| CN | 101633031 B | * | 7/2015 | .............. B22C 9/04 |
| CN | 103387747 B | | 9/2015 | |
| CN | 101918329 B | | 1/2016 | |
| JP | 06-087667 A | | 3/1994 | |
| JP | 4316615 B2 | * | 8/2009 | ............ C23C 24/00 |
| JP | 2010-228942 A | | 10/2010 | |
| JP | 2012-121740 A | | 6/2012 | |
| JP | 5024045 B2 | | 9/2012 | |
| JP | 2013-035726 A | | 2/2013 | |
| JP | 2014069992 A | * | 4/2014 | |
| JP | 2017-178708 A | | 10/2017 | |
| JP | 6222223 B2 | | 11/2017 | |
| JP | 2019119668 A | * | 7/2019 | |
| KR | 10-2008-0034462 A | | 4/2008 | |
| KR | 20190079527 A | * | 7/2019 | .............. C03B 5/24 |
| KR | 10-2020-0088477 A | | 7/2020 | |
| NL | 195098 C | | 5/2004 | |
| TW | 200718664 A | | 5/2007 | |
| TW | 200940467 A | * | 10/2009 | .............. C03B 7/02 |
| WO | WO-0208128 A1 | * | 1/2002 | .............. C03B 5/42 |
| WO | WO-2007020754 A1 | * | 2/2007 | ............ C03B 5/225 |
| WO | 2009/058330 A1 | | 5/2009 | |

OTHER PUBLICATIONS

Machine translation JP 2010228942 (Year: 2010).*

Machine translation of JP 2014069983 (Year: 2014).*

Machine translation of JP 2014069992 (Year: 2014).*

Machine translation CN 101633031 (Year: 2015).*

Machine translation JP 4316615 (Year: 2009).*

International Search Report and Written Opinion of the International Searching Authority, PCT/US2022/014510; mailed on May 16, 2022, 13 pages; Korean Patent Office.

Chinese Patent Application No. 202280005831.0, Office Action dated Mar. 28, 2025, 4 pages (English Translation only), Chinese Patent Office.

Japanese Patent Application No. 2023-547832 , Office Action dated Sep. 24, 2025, 6 pages (English Translation only), Japanese Patent Office.

Korean Patent Application No. 10-2023-7030564 , Office Action dated Sep. 22, 2025, 8 pages (English Translation only), Korean Patent Office.

* cited by examiner

<u>100A</u>

40    30    10    G    20

100B

100C

GLASS TRANSPORT SYSTEM

CROSS-REFERENCE TO RELATED APPLICATIONS

This application is a national stage entry of International Patent Application Serial No. PCT/US2022/014510, filed on Jan. 31, 2022, which in turn, claims the benefit of priority under 35 U.S.C. § 119 of U.S. Provisional Application Ser. No. 63/147,471 filed on Feb. 9, 2021, the contents of each of which are relied upon and incorporated herein by reference in their entireties.

FIELD

The present disclosure relates to molten glass delivery systems. In particular, the present disclosure relates to a molten glass transport system that mitigates catastrophic failure of the system when the molten glass leaks.

BACKGROUND

The current high temperature molten glass transport systems suffer from glass leaks that can compromise the insulating performance of the castable materials and the thermal insulation material layers that support the platinum pipes. Inventors have observed several melt systems that have experienced glass leaks. Glass leaks in the Pt delivery system are often caused by high temperature exceeding 1640° C. Aging, melt contamination, design flaws, and human error can also contribute to glass leaks. These glass leaks ultimately decrease melt system life through degradation of the thermal insulation, loss in integrity of the system, blister, and glass contamination mostly focused around the finer. However, leaks around other parts of the molten glass transport system can also cause various problems. Glass leaks in molten glass transport system is not desirable because it can shorten the life of the system and may require rebuilds that can be very costly.

Several components of Pt delivery system are surrounded by refractory materials. This includes insulating bricks and support materials for the Pt finer. Currently, a fused zirconia cradle is implemented around the delivery system as a corrosion resistant barrier for the purpose of containing leaks and supporting the Pt finer. The installation of the cradle is followed by a castable material that fills the gaps between the cradle and the Pt finer. When a leak in the Pt system occurs, the glass interacts with the castable and fused zirconia cradle. While these zirconia materials are ideal for corrosion resistance in the case of exposure to molten glass, the cradle is a dense material prone to thermal cracking and shock and will not always fully contain a glass leak. Failure analysis of failed Pt systems have shown that glass from pinhole leaks in the Pt system can migrate around the cradle, through the cracks, and react with the surrounding castable, the second ring of defense. If the leaked glass makes it through the castable, it could damage the surrounding thermal insulation material, diminishing the thermal insulation property which is detrimental to the system. Loss of thermal insulation results in loss of heat from the molten glass inside the Pt pipe transporting vessels and will require more and more electricity to keep the glass in the molten state. This will drive cost of production, decrease the life of the system, and eventually, if the heat loss is too great, the system will fail because the molten glass temperature cannot be maintained.

Thus, an improved molten glass transport system is desired.

SUMMARY

Disclosed is a glass transport system comprising: a metal vessel configured to convey molten glass; a support structure comprising a refractory material at least partially surrounding the metal vessel; a silica-containing material at least partially surrounding the support structure; and a thermal insulation material surrounding the silica-containing material, wherein when the molten glass leaks out of the metal vessel and the support structure and flows into the silica-containing material, the silica in the silica-containing material interacts with the molten glass and results in increase in viscosity of the molten glass to mitigate or stop the leak.

Also disclosed is a glass transport system comprising: a metal vessel configured to convey molten glass; a first support structure comprising a silica-containing material at least partially surrounding the metal vessel; and a thermal insulation material surrounding the support structure, wherein when the molten glass leaks out of the metal vessel and flows into the first support structure, the silica in the silica-containing material interacts with the molten glass and results in increase in viscosity of the molten glass to mitigate or stop the leak.

Also disclosed is a glass transport system comprising: a metal vessel configured to convey molten glass; a support structure comprising a refractory material at least partially surrounding the metal vessel; and a first thermal insulation material surrounding the support structure; a refractory layer surrounding the first thermal insulation material; a second thermal insulation material surrounding the refractory layer; and one or more injection tubes extending into the first thermal insulation material and configured to inject a silica-containing material into the first thermal insulation material, wherein when the molten glass leaks out of the metal vessel and the support structure and flows into the first thermal insulation material, injection of the silica-containing material into the first thermal insulation material causes the silica in the silica-containing material to interact with the molten glass and results in increase in viscosity of the molten glass to mitigate or stop the leak.

Also disclosed is a glass transport system comprising: a metal vessel configured to convey molten glass; a support structure comprising a refractory material at least partially surrounding the metal vessel; and a thermal insulation material surrounding the support structure; one or more injection tubes extending into the support structure and configured to inject a silica-containing material into the support structure, wherein when the molten glass leaks out of the metal vessel and flows into the support structure, injection of the silica-containing material into the support structure causes the silica in the silica-containing material to interact with molten glass and results in increase in viscosity of the molten glass to mitigate or stop the glass leak.

Also disclosed is a method to mitigate glass leak in a glass transport system, wherein the glass transport system comprises a metal vessel configured to convey molten glass, and a support structure at least partially surrounding the metal vessel, the method comprising: at least partially surrounding the support structure with a silica-containing material, whereby when the molten glass leaks out of the metal vessel and the support structure and flows into the silica-containing material, the silica in the silica-containing material interacts with the molten glass to increase viscosity of the molten glass to mitigate or stop the glass leak.

Also disclosed is a method to mitigate glass leak in a glass transport system, wherein the glass transport system comprises a metal vessel configured to convey molten glass, a support structure at least partially surrounding the metal vessel, and a thermal insulation material surrounding the support structure, the method comprising: injecting a silica-containing material into the glass transport system, when a leak of the molten glass out of the metal vessel is detected, whereby the silica in the silica-containing material interacts with the molten glass to increase viscosity of the molten glass to mitigate or stop the glass leak.

BRIEF DESCRIPTION OF THE DRAWINGS

These figures are provided for the purposes of illustration, it being understood that the embodiments disclosed and discussed herein are not limited to the arrangements and instrumentalities shown. The figures are schematic and they are not to scale. They are not intended to show dimensions or actual proportions.

DETAILED DESCRIPTION

Figure 1:
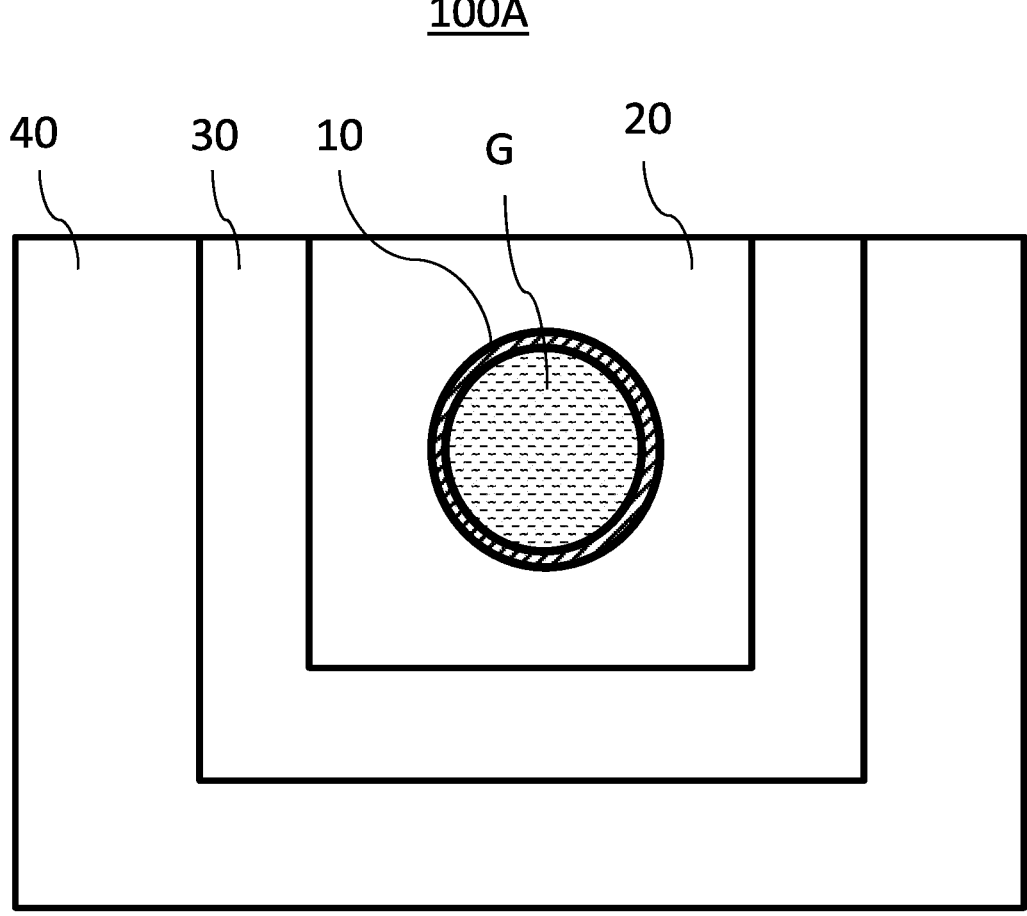
FIG. 1 is a generalized schematic illustration of a cross-sectional view of a glass transport system according to an embodiment.

Various embodiments for improved glass forming processes are described with reference to the figures, where like elements have been given like numerical designations to facilitate an understanding.

It also is understood that, unless otherwise specified, terms such as "top," "bottom," "outward," "inward," and the like are words of convenience and are not to be construed as limiting terms. In addition, whenever a group is described as comprising at least one of a group of elements and combinations thereof, the group can comprise, consist essentially of, or consist of any number of those elements recited, either individually or in combination with each other.

Similarly, whenever a group is described as consisting of at least one of a group of elements or combinations thereof, the group can consist of any number of those elements recited, either individually or in combination with each other. Unless otherwise specified, a range of values, when recited, includes both the upper and lower limits of the range. As used herein, the indefinite articles "a," and "an," and the corresponding definite article "the" mean "at least one" or "one or more," unless otherwise specified.

Those skilled in the art will recognize that many changes can be made to the embodiments described while still obtaining the beneficial results of the disclosure. It also will be apparent that some of the desired benefits of the present disclosure can be obtained by selecting some of the described features without using other features. Accordingly, those of ordinary skill in the art will recognize that many modifications and adaptations are possible and can even be desirable in certain circumstances and are part of the disclosure. Thus, the following description is provided as illustrative of the principles of the present disclosure and not in limitation thereof.

Disclosed herein are various embodiments of a molten glass delivery system that introduce silica at strategic locations to change the viscosity of any glass leak to mitigate or stop the flow of the glass leak to prevent catastrophic failure of the system. High silica material is incorporated into the molten glass transport system at strategic locations that are prone to glass leak. Then, any leaked glass flow will be exposed to silica, dissolving silica into the glass and increase the viscosity of the glass. The glass leak prone areas are typically any portions along the metal vessel/tube that moves molten glass through the system that involve two sections of the metal vessel/tube connecting to one another or where a section of the metal vessel/tube makes a turn and form a corner.

Some examples of high silica materials include fused silica, quartz, cristobalite, high silica clay minerals, non-oxide ceramics, oxide ceramics, etc., or combinations thereof. Therefore, in the various embodiments disclosed herein, the silica-containing material used can comprise one or more of fused silica, quartz, cristobalite, high silica clay minerals, non-oxide ceramics, oxide ceramics, etc. or combinations thereof. The high silica materials can be provided in the molten glass delivery system in the form of bricks, catables, cement, mortar, etc. Higher viscosity will minimize or stop the flow of the glass leak protecting the outer thermal insulation material.

Referring to FIG. 1, a glass transport system 100A according to an embodiment is disclosed. The glass transport system 100A comprises a metal vessel 10 for conveying molten glass G, a support structure 20, a silica-containing material layer 30 at least partially surrounding the support structure 20, and a thermal insulation material layer 40 that surrounds the silica-containing material layer 30. The support structure 20 comprises a refractory material at least partially surrounding the metal vessel 10. The refractory material used for the support structure 20 is generally selected to be corrosion-resistant.

The silica-containing material layer 30 need not be the only material that is present between the support structure 20 and the insulation material layer 40. The present invention encompasses variations where other refractory materials, in layer form or in other appropriate configuration, can be present along with the silica-containing material layer 30. This is also true for the embodiments illustrated in the other schematic FIGS. 2A-4. Wherever silica-containing material is introduced into a glass transport system, the silica-containing material need not be the only material present and there can be other refractory materials present in layer form or in other appropriate configuration.

In some embodiments, the support structure 20 comprises a cradle for supporting the metal vessel 10. The cradle can be configured as a trough-like structure that supports the metal vessel 10. In some embodiments, the support structure 20 can fully surround the metal vessel 10.

One of ordinary skill in the art will readily understand that in actual glass transport system 100A, the support structure 20 can comprise some portions that extend through the silica-containing material layer 30 and the insulation material layer 40 and be secured to a floor or a wall, as the case maybe, to support the metal vessel 10. Such portions can be in the form of structural beams, buttress, etc. This is also true for the support structures illustrated in the embodiments illustrated in the other schematic FIGS. 2A-4.

With this configuration, when the molten glass G leaks out of the metal vessel 10 and the support structure 20 and flows into the silica-containing material layer 30, the silica in the silica-containing material interacts with the molten glass and results in increase in viscosity of the molten glass G to slow the flow of the glass leak and mitigate or stop the leak.

In some embodiments, the silica-containing material layer 30 is made of a material comprising one or more of fused silica, quartz, cristobalite, high silica clay, non-oxide ceramics, oxide ceramics, etc., or combinations thereof. The amount of silica in the silica-containing material layer is selected to be sufficient to effectively increase the viscosity of the molten glass. In all embodiments 100A, 100B, 100C, 100D, 100E of the glass transport system disclosed herein, the silica-containing material used therein can comprise one or more of fused silica, quartz, cristobalite, high silica clay, non-oxide ceramics, oxide ceramics, etc., or combinations thereof.

In all of the embodiments of the glass transport system disclosed herein the metal vessel 10 is a piping operable to deliver molten glass G. In some embodiments, the metal vessel 10 comprises platinum and/or an alloy thereof.

In some embodiments, the refractory material for the corrosion-resistant support structure 20 comprises zirconia or alumina-based refractory material. The zirconia-based refractory material can be fused zirconia.

Figure 2A:
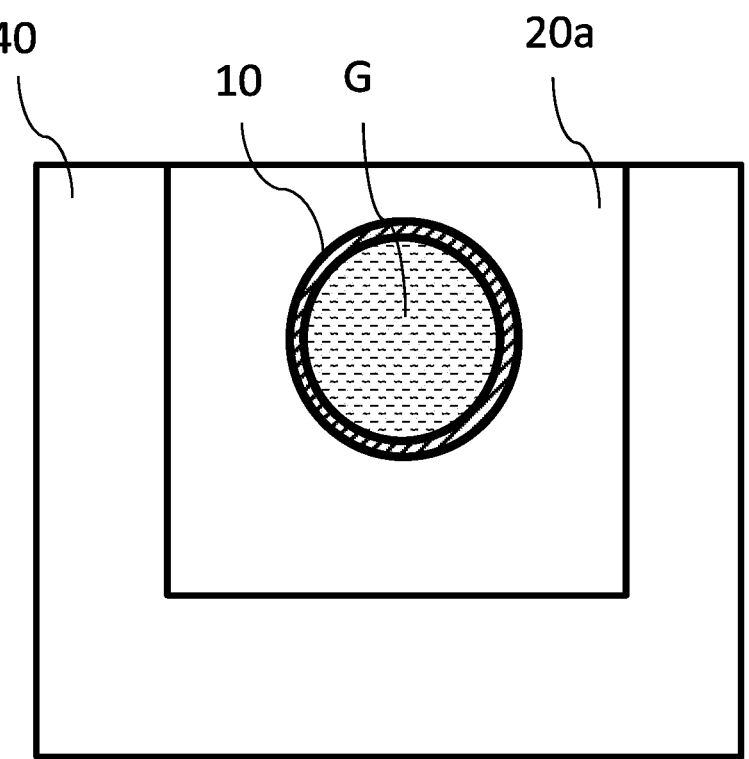
FIG. 2A is a generalized schematic illustration of a cross-sectional view of a glass transport system according to another embodiment.

Referring to FIG. 2A, a glass transport system 100B according to another embodiment is disclosed. The glass transport system 100B comprises a metal vessel 10 for conveying molten glass G, a first support structure 20a comprising a silica-containing material, and a thermal insulation material layer 40. The first support structure 20a at least partially surrounds the metal vessel 10. With the configuration of the glass transport system 100B, when the molten glass G leaks out of the metal vessel 10 and flows into the first support structure 20a, the silica in the silica-containing material interacts with the molten glass resulting in increase in viscosity of the molten glass G to mitigate or stop the leak.

Because of the silica-containing material is used for the support structure 20a, the glass transport system 100B is suitable for low temperature glass such as glass with melting temperature <1400° C. In some embodiments, the metal vessel 10 is made of a refractory metal such as Pt.

In some embodiments of the glass transport system 100B, the first support structure 20a comprises a cradle for supporting the metal vessel 10. The cradle can be configured as a trough-like structure that supports the metal vessel 10. In some embodiments, the first support structure 20a can surround the full circumference of the metal vessel 10.

Figure 2B:
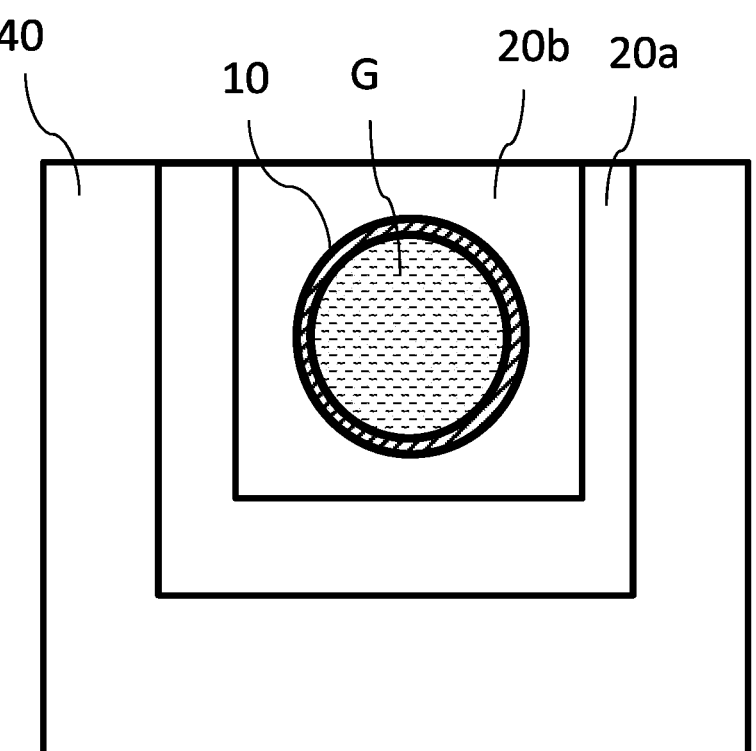
FIG. 2B is a generalized schematic illustration of a cross-sectional view of a glass transport system according to another embodiment.

Referring to FIG. 2B, in embodiments where the molten glass is a high temperature glass such as glass with melting temperature >1400° C., the glass transport system 100C further includes a second support structure 20b formed of a higher-strength refractory material provided between the metal vessel 10 and the first support structure 20a of silica-containing material. The second support structure 20b at least partially surrounds the metal vessel. In some embodiments, the refractory material for the second support structure 20b comprises zirconia or alumina-based refractory material. The zirconia-based refractory material can be fused zirconia. The second support structure 20b can comprises a cradle for supporting the metal vessel 10. In some embodiments, the second support structure 20b can surround the full circumference of the metal vessel 10.

Figure 3:
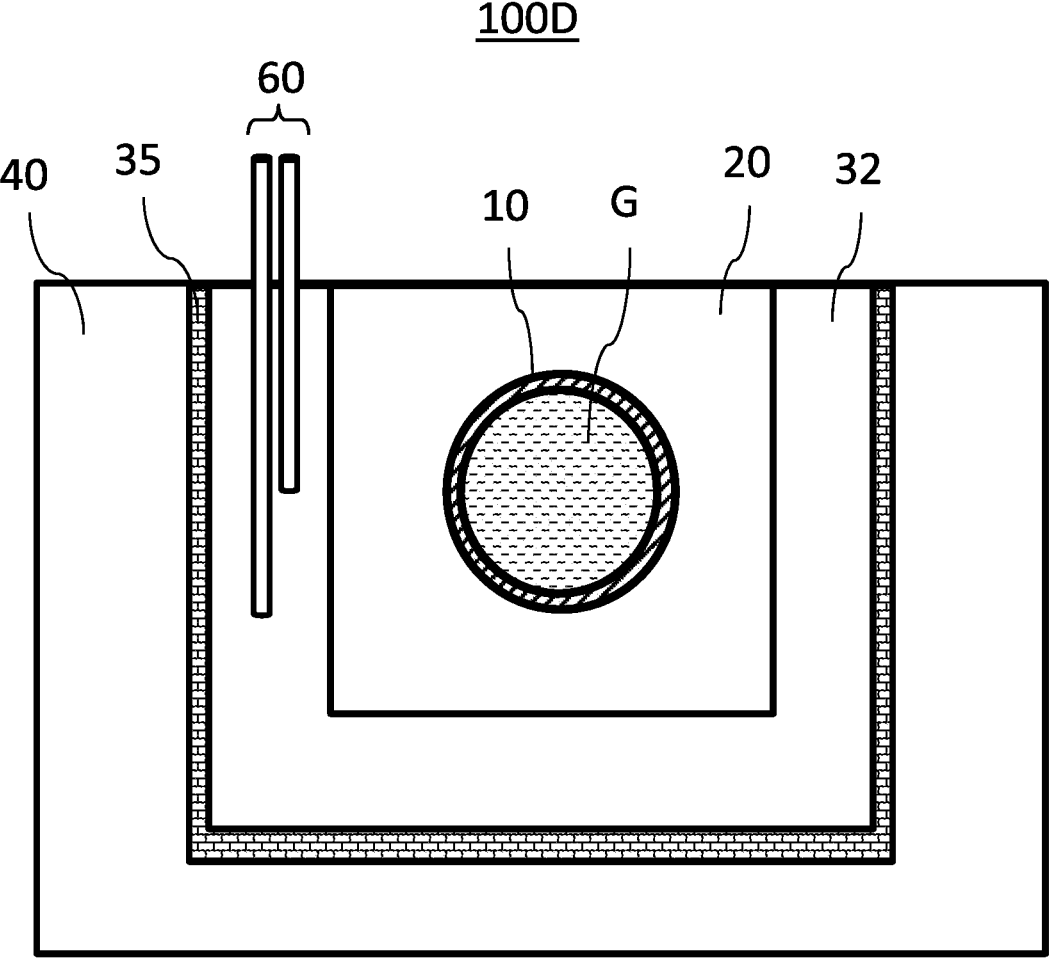
FIG. 3 is a generalized schematic illustration of a cross-sectional view of a glass transport system according to another embodiment.

Referring to FIG. 3, a glass transport system 100D according to another embodiment is disclosed. The glass transport system 100D comprises a metal vessel 10 for conveying molten glass G, a support structure 20 comprising a refractory material at least partially surrounding the metal vessel 10; and a first thermal insulation material layer 32 surrounding the support structure 20; a refractory layer 35 surrounding the first thermal insulation material layer 32; a second thermal insulation material layer 40 surrounding the refractory layer 35; and one or more injection tubes 60 extending into the first thermal insulation material layer 32 for injecting silica-containing material into the first thermal insulation material layer 32. The injection tubes 60 can be made of any refractory material including alumina, and silica-based refractory. The silica-containing material comprises one or more of fused silica, quartz, cristobalite, high silica clay, non-oxide ceramics, oxide ceramics, or combinations thereof. The injectable silica-containing material can be in a paste form such as colloidal or powder silica suspended in liquid. The support structure 20 can comprise zirconia or alumina-based refractory material.

With the configuration of the glass transport system 100D, when the molten glass G leaks out of the metal vessel 10 and the support structure 20 and flows into the first thermal insulation material layer 32 and the leak is detected, injection of silica-containing material into the first thermal insulation material layer 32 via the one or more injection tubes 60 causes the silica in the silica-containing material to interact with the molten glass G resulting in increase in viscosity of the molten glass to mitigate or stop the leak. One of the ways such glass leak can be detected is by carefully monitoring the electrical power consumption to maintain the temperature of the molten glass flowing through the glass transport system. When glass leak flows into the region where thermal insulation materials are, the insulating property of the thermal insulation material degrades substantially and drastically and, as a result, the system must expend drastically and substantially more electricity to power the heater elements. Thus, by monitoring the power consumption, one can detect a glass leak in the system.

Figure 4:
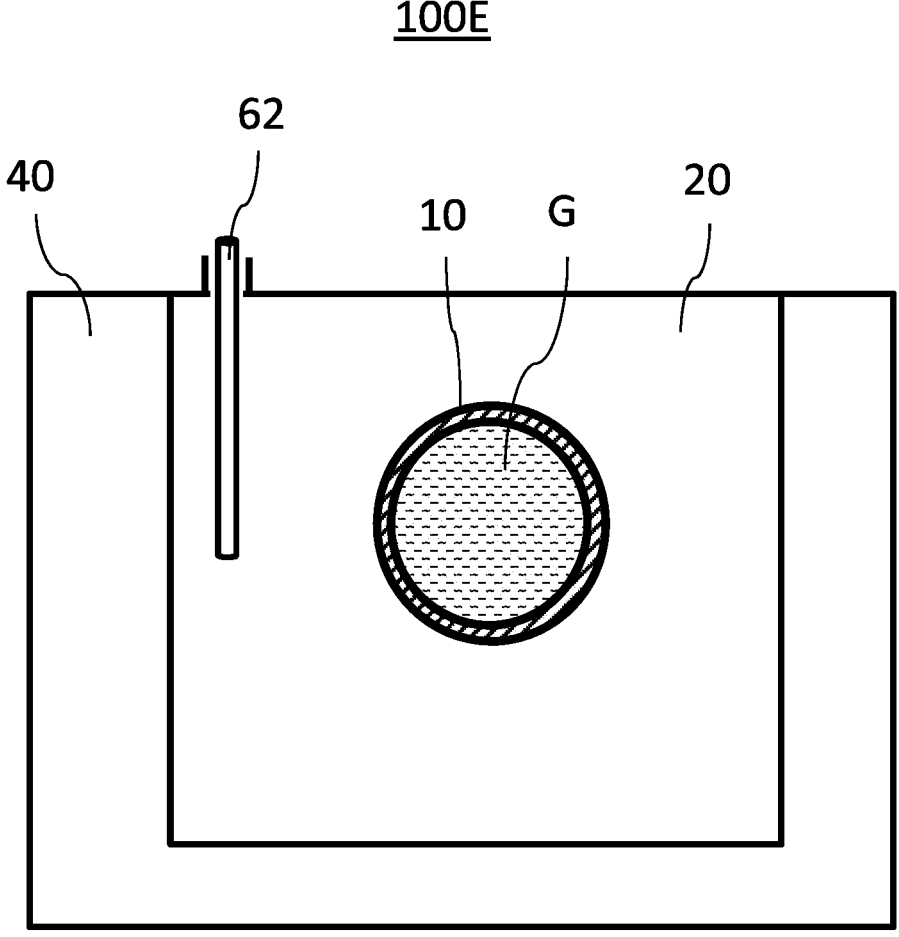
FIG. 4 is a generalized schematic illustration of a cross-sectional view of a glass transport system according to another embodiment.

Referring to FIG. 4, a glass transport system 100E according to another embodiment is disclosed. The glass transport system 100E comprises a metal vessel 10 for conveying molten glass G, a support structure 20 comprising a refractory material at least partially surrounding the metal vessel, and a thermal insulation material layer 40 surrounding the support structure 20, one or more injection tubes 62 extending into the support structure 20 for injecting silica-containing material into the support structure 20. As with the injection tubes 60, the one or more injection tubes 62 can be made of any refractory material including alumina, and silica based refractory material.

With the configuration of the glass transport system 100E, when the molten glass G leaks out of the metal vessel 10 and flows into support structure 20, injection of silica-containing material into the support structure 20 causes the silica in the silica-containing material to interact with the molten glass G resulting in increase in viscosity of the molten glass to mitigate or stop the leak. In the glass transport system 100E, the injection tubes 60 are positioned to extend into glass leak prone areas within the support structure 20.

In some embodiments, the glass transport system can comprise a configuration that incorporates the silica-containing material injection features of both embodiments 100D and 100E. Such glass transport system can comprise injection tubes that are positioned to be able to independently inject the silica-containing material into either or both the support structure 20 and the first thermal insulation material layer 32. When a glass leak is detected, silica-containing material can be injected into the support structure 20, the first thermal insulation material 32, or both if desired.

In the various embodiments of the inventive glass transport system disclosed herein, the viscosity of the leaked molten glass increases through dissolution of silica from encounter with the silica-containing materials provided in the glass transport system as well as the cooling of the leaked molten glass as it flows away from the metal vessel 10. In some embodiments, the viscosity of the leaked molten glass reaches the softening point viscosity of the leaked glass which is approx. 10^7.6 poise. Softening point of a glass is a temperature at which a glass fiber less than one millimeter in diameter will stretch under its own weight at a rate of one millimeter per minute when suspended vertically.

Experimental Data

Several experiments were performed, including silica solubility using Corning 7980 fused-silica particles against Corning's Eagle XG® glass. Solubility tests were conducted at approximate finer temperatures (1620° C.) for 72 hours. Analysis by EPMA (Electron Probe Micro Analyzer) showed 48.9% increase in silica (~30 wt. % $SiO_2$) content in Eagle XG® glass. This data is presented in Table 1.

TABLE 1

| | Eagle XG Glass - 1620° C. SiO2 (Wt %) Solubility Data by EPMA | | | | | B by Diff |
|---|---|---|---|---|---|---|
| No. | SiO2 | Al2O3 | SrO | CaO | MgO | B2O3 |
| 1 | 92.80 | 1.44 | 0.0149 | 0.88 | 0.07 | 4.80 |
| 2 | 92.97 | 1.36 | 0.0100 | 0.88 | 0.06 | 4.74 |
| 3 | 93.48 | 1.01 | 0.0090 | 0.64 | 0.05 | 4.81 |
| 4 | 90.71 | 2.28 | 0.0208 | 1.46 | 0.11 | 5.53 |
| 5 | 91.12 | 2.02 | 0.0159 | 1.26 | 0.09 | 5.49 |
| 6 | 94.13 | 0.44 | 0.0041 | 0.28 | 0.01 | 5.12 |
| 7 | 94.99 | 0.08 | 0.0012 | 0.09 | 0.01 | 4.85 |
| 8 | 93.96 | 0.73 | 0.0090 | 0.47 | 0.04 | 4.79 |
| 9 | 93.33 | 1.09 | 0.0110 | 0.69 | 0.06 | 4.83 |
| 10 | 94.12 | 0.59 | 0.0051 | 0.37 | 0.03 | 4.88 |
| Average | 93.16 | 1.10 | 0.01 | 0.70 | 0.05 | 4.98 |
| XG | 62.56 | 17.21 | 0.80 | 0.80 | 1.39 | 10.30 |
| % Change | 48.9 | −93.6 | −98.7 | −12.3 | −96.2 | −51.6 |

Figure 5:
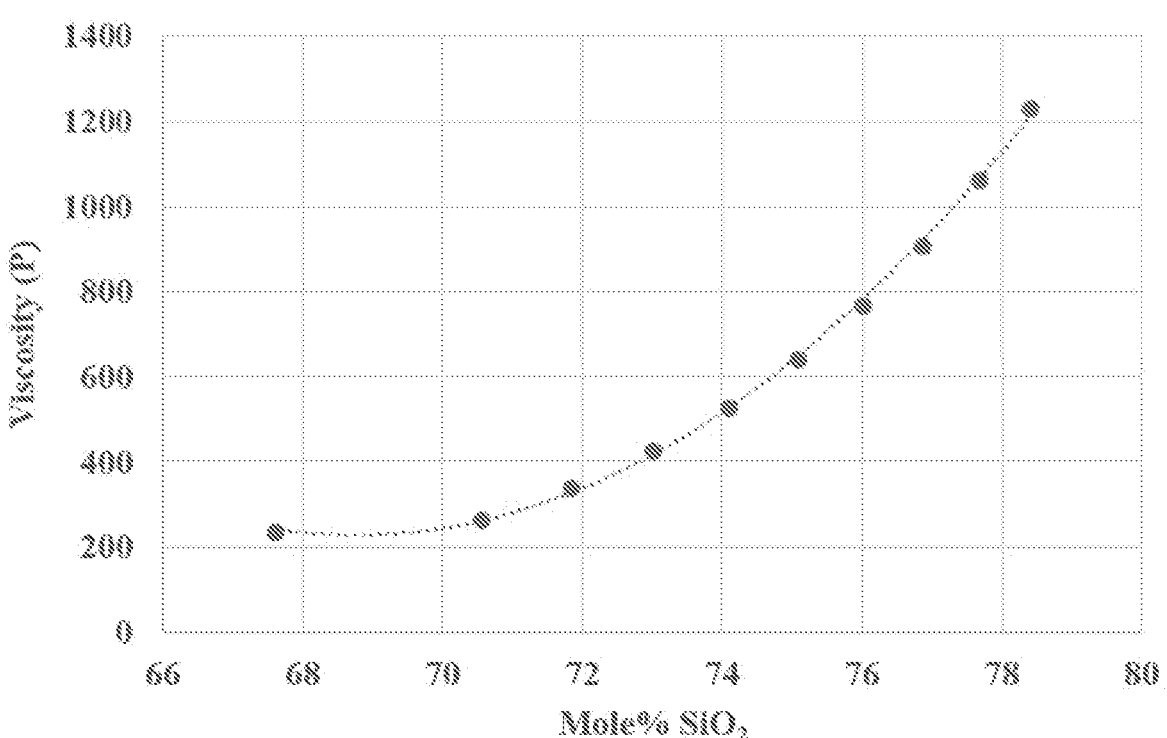
FIG. 5 is a modeled plot of viscosity (P) vs. $SiO_2$ (mol. %) of Eagle XG® glass at 1620° C.

Based on this data, silica readily dissolved into Eagle XG® glass at finer temperatures, significantly changing its glass composition and properties such as viscosity. FIG. 5 shows a modeled plot of viscosity (P) vs. $SiO_2$ (mol. %) of Eagle XG® glass at 1620° C. Data shows that with increasing $SiO_2$ content at 1620° C., the viscosity of Eagle XG® glass increases. This would have substantial implications in decreasing glass flow in a leak situation.

Those skilled in the art will appreciate that many modifications to the exemplary embodiments described herein are possible without departing from the spirit and scope of the disclosure. Thus, the description is not intended and should not be construed to be limited to the examples given but should be granted the full breadth of protection afforded by the appended claims and equivalents thereto. In addition, it is possible to use some of the features of the present disclosure without the corresponding use of other features. Accordingly, the foregoing description of exemplary or illustrative embodiments is provided for the purpose of illustrating the principles of the present disclosure and not in limitation thereof and can include modification thereto and permutations thereof.

While preferred embodiments of the present disclosure have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What is claimed is:

1. A method of mitigating glass leak in a glass transport system, wherein the glass transport system comprises a metal vessel configured to convey molten glass, a support structure at least partially surrounding the metal vessel, and a thermal insulation material surrounding the support structure, the method comprising:

Conveying molten glass into the metal vessel

A detection step to determine if there is molten glass leaking from the metal vessel injecting a silica-containing material inside at least one of the support structure or the thermal insulation material of the glass transport system, when a leak of the molten glass out of the metal vessel is detected, whereby the silica in the silica-containing material interacts with the molten glass to increase viscosity of the molten glass to mitigate or stop the glass leak.

2. The method of claim 1, wherein the silica-containing material comprises one or more of fused silica, quartz, cristobalite, high silica clay, non-oxide ceramics, oxide ceramics, or combinations thereof.

3. The method of claim 1, wherein the silica-containing material is in a paste form.

4. The method of claim 1, wherein the silica-containing material is injected into the support structure.

5. The method of claim 1, wherein the silica-containing material is injected into the thermal insulation material.

6. The method of claim 1, wherein the silica-containing material is injected into both the support structure and the thermal insulation material.

7. The method of claim 1, wherein injecting the silica-containing material comprises injecting the silica-containing material through one or more injection tubes extending into at least one of the support structure or the thermal insulation material.

8. The method of claim 1, detecting the leak of the molten glass out of the metal vessel.

9. The method of claim 1, wherein the metal vessel is a platinum or platinum allow metal vessel configured to convey molten glass at temperatures exceeding 1400° C.

10. A glass transport system comprising:

a metal vessel configured to convey molten glass;

a support structure comprising a refractory material at least partially surrounding the metal vessel;

a thermal insulation material surrounding the support structure; and a silica-containing material injection system configured to, when the molten glass leaks out of the metal vessel, inject a silica-containing material inside at least one of the support structure or the thermal insulation material, whereby the silica in the silica-containing material interacts with the molten glass to increase viscosity of the molten glass to mitigate or stop the glass leak.

11. The glass transport system of claim 10, wherein the silica-containing material comprises one or more of fused silica, quartz, cristobalite, high silica clay, non-oxide ceramics, oxide ceramics, or combinations thereof.

12. The glass transport system of claim 10, wherein the silica-containing material is in a paste form.

13. The glass transport system of claim 10, wherein the silica-containing material is injected into both the support structure and the thermal insulation material.

14. The glass transport system of claim 10, wherein the silica-containing material injection system comprises one or more injection tubes extending into at least one of the support structure or the thermal insulation material.

15. The glass transport system of claim 10, further comprising a silica-containing material layer at least partially surrounding the support structure.

16. The glass transport system of claim 10, wherein the metal vessel comprises platinum.

17. The glass transport system of claim 10, wherein the support structure comprises a cradle configured to support the metal vessel.

18. The glass transport system of claim 10, wherein the refractory material comprises zirconia or alumina.

19. The glass transport system of claim 18, wherein the zirconia comprises fused zirconia.

* * * * *